US009606948B2

(12) United States Patent
Monroe et al.

(10) Patent No.: US 9,606,948 B2
(45) Date of Patent: Mar. 28, 2017

(54) CAN BUS EDGE TIMING CONTROL FOR DOMINANT-TO-RECESSIVE TRANSITIONS

(71) Applicant: TEXAS INSTRUMENTS INCORPORATED, Dallas, TX (US)

(72) Inventors: Scott Allen Monroe, Frisco, TX (US); David Wayne Stout, Lewisville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 449 days.

(21) Appl. No.: 14/087,879

(22) Filed: Nov. 22, 2013

(65) Prior Publication Data

US 2014/0156893 A1   Jun. 5, 2014

Related U.S. Application Data

(60) Provisional application No. 61/733,740, filed on Dec. 5, 2012.

(51) Int. Cl.
*G06F 13/362*   (2006.01)
*G06F 13/372*   (2006.01)
*G06F 13/364*   (2006.01)

(52) U.S. Cl.
CPC .......... *G06F 13/372* (2013.01); *G06F 13/364* (2013.01); *G06F 13/3625* (2013.01)

(58) Field of Classification Search
USPC .................. 710/104–119, 305–315
See application file for complete search history.

(56) References Cited

U.S. PATENT DOCUMENTS

| 5,796,962 | A  | * | 8/1998  | Fant    | G06F 5/08   |
|           |    |   |         |         | 326/36      |
| 6,324,044 | B1 | * | 11/2001 | Teggatz | G06F 13/385 |
|           |    |   |         |         | 327/379     |
| 7,242,227 | B2 | * | 7/2007  | Pauletti| H04L 25/085 |
|           |    |   |         |         | 327/112     |
| 8,391,318 | B2 | * | 3/2013  | Hartwich| 370/294     |

FOREIGN PATENT DOCUMENTS

EP   2521319 A1   11/2012

* cited by examiner

*Primary Examiner* — Raymond Phan
(74) *Attorney, Agent, or Firm* — Andrew Viger; Charles A. Brill; Frank D. Cimino

(57) ABSTRACT

Structures and methods herein insert one or more parallel "recessive nulling" driver impedances across a controller area network (CAN) bus starting at the time of a dominant-to-recessive data bit transition and extending for a selected recessive nulling time period. Doing so increases a rate of decay of a CAN bus dominant-to-recessive differential signal waveform, permits a shortened recessive bit time period, and allows for increased CAN bus bandwidth. Various modes of operation are applicable to various CAN bus node topologies. Recessive nulling may be applied to only the beginning portion of a recessive bit following a dominant bit ("LRN mode") or to the entire recessive bit time ("HRN mode"). And, some embodiments may apply LRN operations to some recessive CAN frame bits and HRN operations to others.

20 Claims, 10 Drawing Sheets

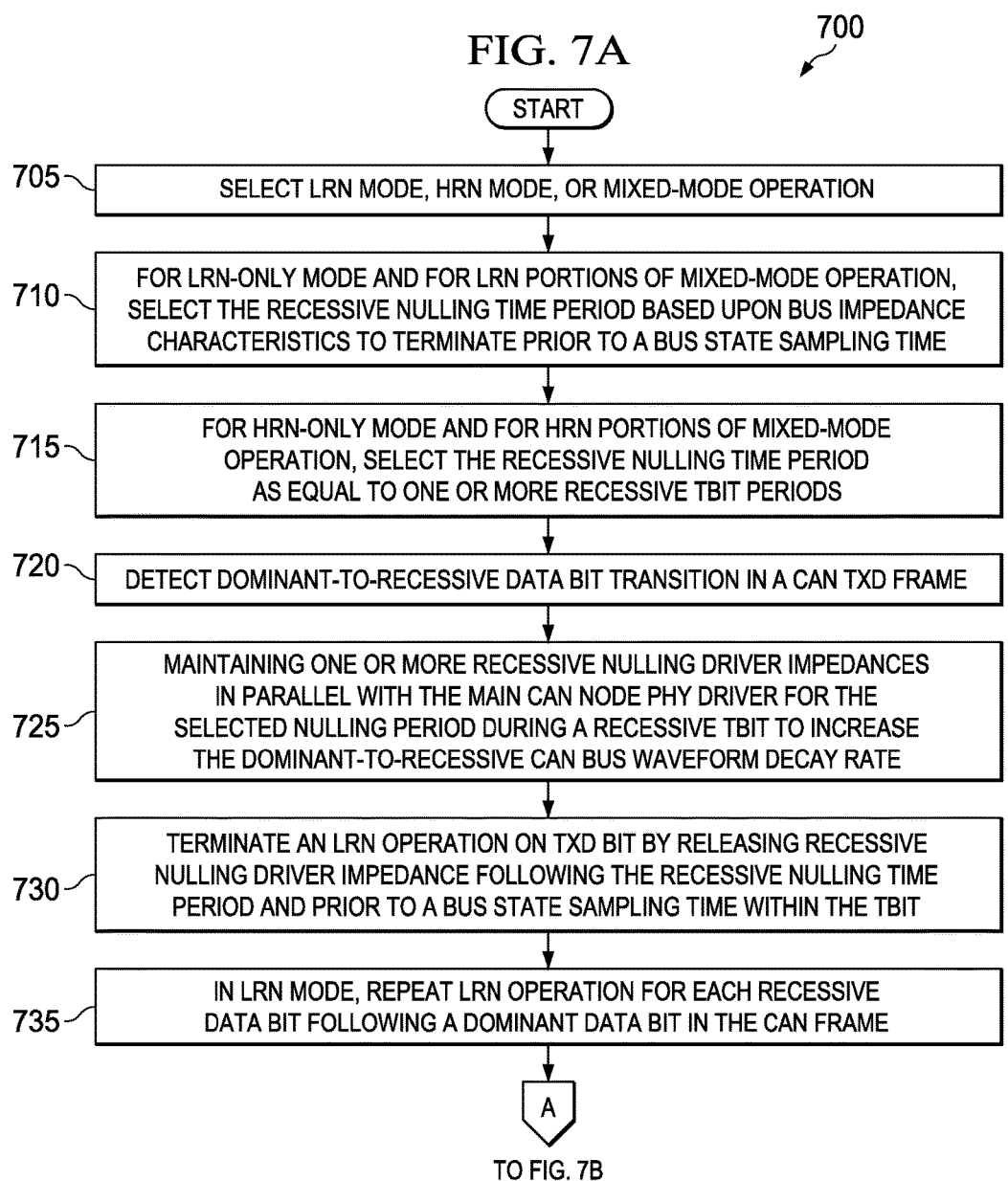

CAN BUS EDGE TIMING CONTROL FOR DOMINANT-TO-RECESSIVE TRANSITIONS

PRIORITY CLAIM

This application claims the benefit of priority under 35 U.S.C. §119(e) to U.S. Provisional Patent Application Ser. No. 61/733,740 titled "Variable Dominant to Recessive Edge Timing Control For Improved Bit Timing In a CAN Physical Layer Implemented On Various Network Loads," filed on Dec. 5, 2012 and incorporated herein by reference in its entirety.

TECHNICAL FIELD

Structures and methods described herein relate to data networking, including bus edge timing control in a controller area network (CAN).

BACKGROUND INFORMATION

A CAN is an International Standards Organization (ISO)-defined serial data communications bus topology and associated peer-to-peer message-based protocol. The CAN bus is used commercially in automotive, aerospace, maritime and a variety of industrial applications. Additional information regarding the CAN bus may be found in ISO 11898-1: 2003, "Road vehicles—Controller area network (CAN)—Part 1: Data link layer and physical signaling" (confirmed 2009); ISO 11898-2: 2003, "Road vehicles—Controller area network (CAN)—Part 2: High-speed medium access unit" (confirmed 2009); and ISO 11898-5: 2007, "Road vehicles—Controller area network (CAN)—Part 5: High-speed medium access unit with low-power mode" (confirmed 2009).

FIG. 1 is a prior-art diagram illustrating a CAN bus 104 and CAN node architecture 107. One or more nodal devices (e.g., the nodal device 109) associated with each node (e.g., the node 110) such as sensors, actuators, switches, and other control devices typically communicate with each other across the CAN bus 104. Each such nodal device accesses the CAN bus 104 as a sender and/or receiver via a node microcontroller (e.g., the microcontroller 112), a CAN bus node controller (e.g., the CAN controller 115), and a CAN bus differential transceiver (e.g., the CAN transceiver 120).

Termination resistors 130A and 130B, typically 120 ohms each, are positioned at the far ends of the CAN bus 104 to reduce signal reflections and to provide a current path for the differential signal produced by a transmitting CAN transceiver. Other CAN bus impedance elements include the input resistance of each nodal CAN transceiver. A receiver portion of each CAN transceiver presents a high resistance (e.g., the resistance 135 associated with the transceiver 120) across the CAN bus 104 in parallel with the termination resistors 130A and 130B.

Additionally, the wires themselves associated with the CAN bus 104 create a distributed parasitic capacitance (e.g., the capacitance C(D) 140) across the bus 104. The RC time constant of the distributed capacitance 140 in parallel with the combined parallel resistances across the bus 104 may have a significant effect on the shape of CAN bus signals, particularly for bus lengths of many meters with many attached bus nodes, as further described below.

FIG. 2 is a prior-art diagram illustrating a CAN data frame 200. An arbitration field 215 within the data frame 200 includes a dominant-low destination node address assigned to the data frame 200. The lowest binary address has the most dominant (logic zero) high-order bits and the highest priority. CAN nodes contend for the opportunity to transmit a data frame according to a CAN transceiver mechanism referred to as bitwise priority-based bus arbitration. When two or more nodes attempt to transmit data frames on the bus 104 simultaneously, a dominant bit in the arbitration field from one of the contending frames overwrites a recessive bit from another of the contending frames. Once this arbitration/contention process completes for the arbitration field 215, the node transmitting the CAN frame with the highest priority address wins the arbitration and continues transmitting that frame. The other nodes that were attempting to simultaneously transmit a frame perform a back off and the remainder of the arbitration-winning frame is transmitted without further interference from other nodes.

Waveform shapes of the differential signals appearing on the bus 104 during the arbitration portion of the CAN frame are particularly important to ensure the integrity of the arbitration process. Such arbitration-time waveform shapes are frequency dependent in the presence of the above-described bus impedance considerations and ultimately limit CAN bus bandwidth, bus length, and the maximum number of attached nodes. An enhanced CAN technique referred to as "CAN with Flexible Data-Rate" or simply "CAN FD" has been proposed and is in the process of being commercially implemented. Additional information regarding CAN FD may be found in a specification, "CAN with Flexible Data-Rate" Version 1.0 (Released Apr. 17, 2012)© Copyright 2011, Robert Bosch GmbH, Robert Bosch Platz 1, 70839 Gerlingen, Germany, and located at: http://www.bosch-semiconductors.de/en/ubk semiconductors/safe/ip_modules/can_fd/can.html as of Nov. 18, 2013.

Among other considerations, CAN FD proposes transmitting flexible data rate (FD) portions 230 of the data frame 200 with shorter-than-normal bit-time periods. It is noted that a bit time period is referred to herein as a "tbit". The FD portions 230 of the data frame 200 are not involved with arbitration or other bus-sensitive processes during which multiple nodes could attempt to exert the bus 104. Thus, operation in CAN FD mode results in a higher-than-normal bit rate during the FD portions 230 of the data frame 200 and the possibility of higher-than-normal throughput as compared to operation in CAN standard mode.

FIG. 3 is a prior-art diagram illustrating an idealized CAN bus differential waveform 300. The waveform 300 is representative of an idealized CAN bus signal resulting from a transmitting CAN transceiver (e.g., the transceiver 120 of FIG. 1) operating with power supply rails of Vcc equal to 5 volts and ground. An active CAN transceiver drives the waveform 300 to a "dominant" state representing a logic LOW level (logic zero). CAN bus transceivers are biased at approximately Vcc/2 such that the differential waveform peaks CANH 320 and CANL 325 avoid distortion by not approaching the supply voltage rails. A CAN bus logic HIGH "recessive" level 340 results when bus transceiver drivers are inactivated and remove their respective differential output voltages from the bus 104.

FIG. 4 is a prior-art diagram illustrating a CAN bus differential waveform 400 affected by bus RC time constant constraints. In particular, the dominant-to recessive decay time 415 of the falling edge 420 of the waveform 400 to the maximum recessive differential voltage 430 is considerably longer than that of the idealized bus waveform 300 of FIG. 3. The longer decay time 415 is due to the charge stored in the previously-described parasitic capacitance across the bus 104. The residual charge tends to maintain the dominant-state differential voltage across the bus 104 and extend the dominant-to-recessive period during which the bus 104 remains in an ambiguous state and therefor cannot be sampled to determine whether or not a state change has occurred.

The sampling point 440 configured in the bus node controller connected to the bus transceiver is nominally set at approximately 75% into the tbit period 435. Once a node has won arbitration, it is responsible for transmitting the remainder of the CAN frame. The transmitting node controller compares what is being sent on TxD to what is being received. If the data received is different from that sent, the controller will interpret such condition as a transmit error. The transmit error condition will initiate an error frame transmission instead of transmitting the remainder of the data frame. Thus, if the dominant to recessive edge delay time 415 extends to the point 450 where the bus waveforms cross the recessive threshold 430 after the sampling point 440, bus errors will be generated and throughput will suffer. This phenomenon establishes a maximum data rate for a given bus impedance using standard CAN protocols and methods.

BRIEF DESCRIPTION OF THE DRAWINGS

FIGS. 7A and 7B are a flow diagram illustrating a method of CAN bus dominant-to-recessive transmit data bit timing control according to various example sequences.

SUMMARY OF THE INVENTION

Apparatus, systems and methods disclosed herein add additional bus impedance, referred to as "recessive nulling impedance," in parallel across the CAN bus starting at a dominant-to-recessive bit transition. Doing so decreases overall parallel bus impedance to more quickly discharge residual charge stored in parasitic bus capacitance. CAN bus dominant-to-recessive waveform fall rates are increased (fall times shortened), permitting a decrease in CAN frame bit times in order to increase CAN bus bandwidth and throughput without sacrificing the integrity of the CAN bus arbitration mechanism.

The invented structures and methods may operate in a mode referred to herein as "light recessive nulling" (LRN) mode, affecting only a beginning portion of a dominant-to-recessive CAN bus waveform transition prior to the bus state sampling point. For certain special-case, single-master, non-arbitrating bus topologies, the invented structures and methods may operate in a mode referred to herein as "heavy recessive nulling" (HRN) mode. HRN-only mode affects all recessive bits for the entire tbit period. In mixed-mode, HRN mode operation may be performed on recessive bits in the CAN frame not subject to CAN bus arbitration or other multi-sender operations and LRN mode operation may be performed on other CAN frame bits.

Figure 2:
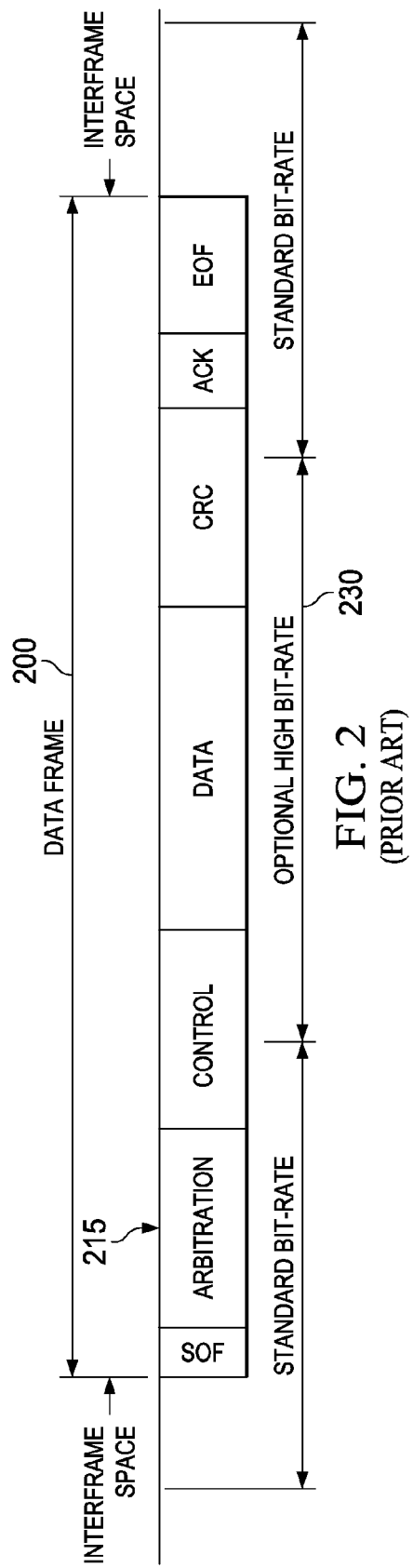
FIG. 2 is a prior-art diagram illustrating a CAN data frame.
Figure 4:
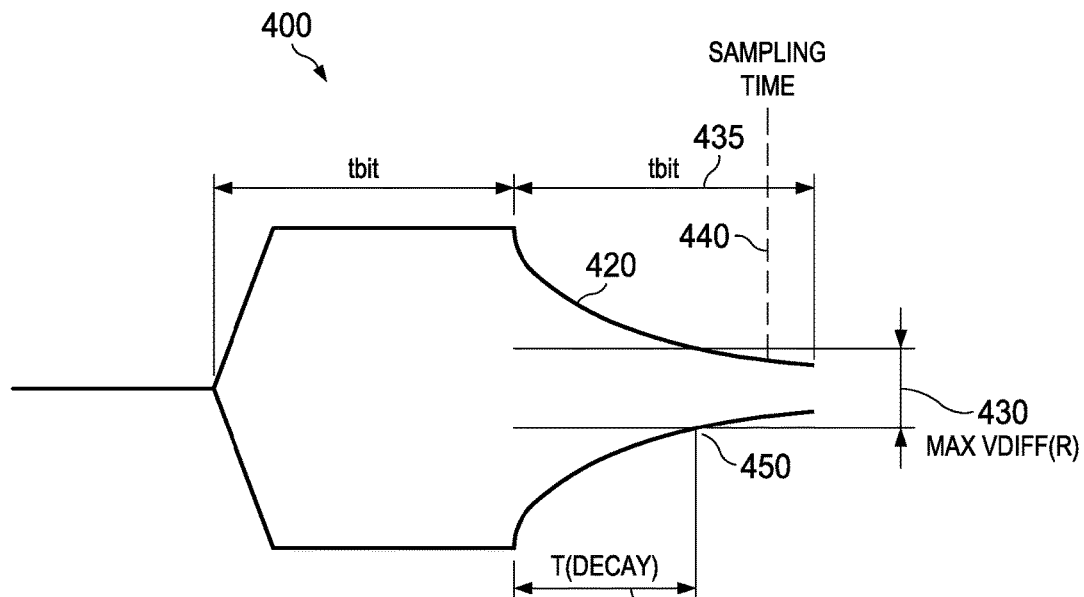
FIG. 4 is a prior-art diagram illustrating a CAN bus differential waveform affected by bus RC time constant constraints.
Figure 5:
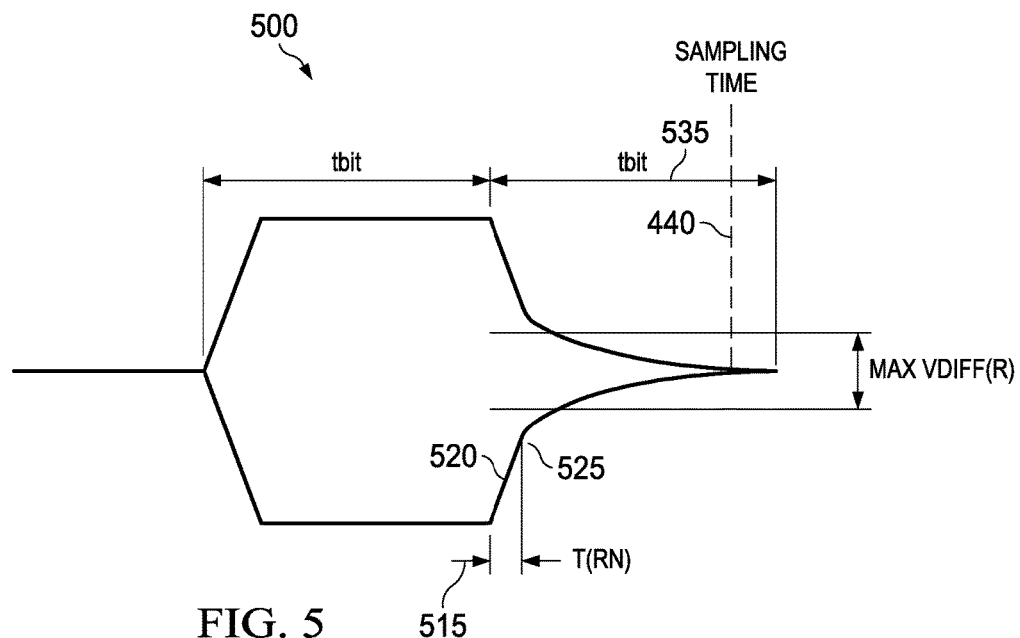
FIG. 5 is a diagram illustrating a CAN bus differential waveform affected by various example embodiments and method activities of the invention.

FIG. 5 is a diagram illustrating a CAN bus differential waveform 500 resulting from various example embodiments and method activities while operating in LRN mode as described in detail below. During a recessive nulling time period [T(RN)] 515, a transmitting CAN transceiver adds additional bus impedance across the CAN bus to decrease the overall parallel bus impedance. Doing so increases the rate of decay of the falling edge 520 of the bus waveform 500 during a dominant-to-recessive TxD bit transition. The transceiver releases the additional impedance from the bus at the end 525 of T(RN) 515 to avoid overloading the bus at the sampling time 440. Overloading the bus at the sampling time 440 could interfere with the arbitration process previously described during the arbitration bit times (e.g., the arbitration field 215 of FIG. 2) of the CAN data frame (e.g., the data frame 200 of FIG. 2). LRN may be applied during dominant-to-recessive bit transitions within the entire CAN frame including the arbitration field and may allow modest increases in data rates by decreasing the tbit period 435 of FIG. 4 to achieve a shortened tbit period 535.

Figure 6:
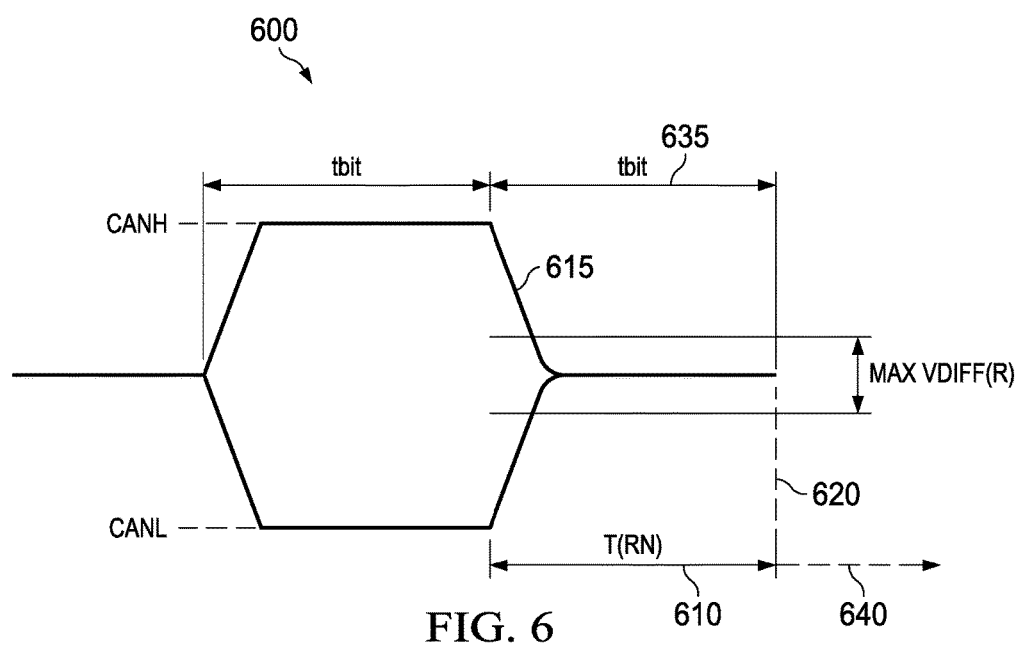
FIG. 6 is a diagram illustrating a CAN bus differential waveform affected by various example embodiments and method activities of the invention.

FIG. 6 is a diagram illustrating a CAN bus differential waveform 600 affected by various example embodiments and method activities of the invention operating in HRN mode. During an HRN mode recessive nulling time period [T(RN)] 610, a transmitting CAN transceiver adds additional bus impedance across the CAN bus beyond that added in LRN mode described above in conjunction with FIG. 5. Doing so decreases the overall parallel bus impedance and increases the rate of decay of the falling edge 615 of the bus waveform 600 beyond that described above for LRN mode. Also, unlike LRN mode, the transmitting CAN transceiver operating in HRN mode does not release the additional bus impedance during the recessive tbit period 635. This effectively extends the HRN mode T(RN) period 610 to the end 620 of the tbit period 635 or even to the end of successive recessive tbit periods 640.

HRN mode recessive nulling may be applied to recessive bits in portions of the CAN frame not subject to arbitration or otherwise subject to multiple nodes attempting to exert the bus simultaneously. HRN may also be used for all recessive frame bits in special cases of bus topologies not subject to multiple nodes attempting to exert the bus simultaneously. An example of the latter case is a single transmitting node sending to one or more listener nodes absent the possibility of a transmission from any node other than the single transmitting node.

Embodiments and method activities herein may also operate in "mixed mode." During mixed-mode operation, portions of a CAN data frame subject to arbitration or otherwise subject to multiple nodes attempting to exert the bus simultaneously may be transmitted in LRN mode. Portions of the CAN data frame not subject to arbitration and not otherwise subject to multiple nodes attempting to exert the bus simultaneously may be transmitted in HRN mode.

DETAILED DESCRIPTION

Figure 7B:
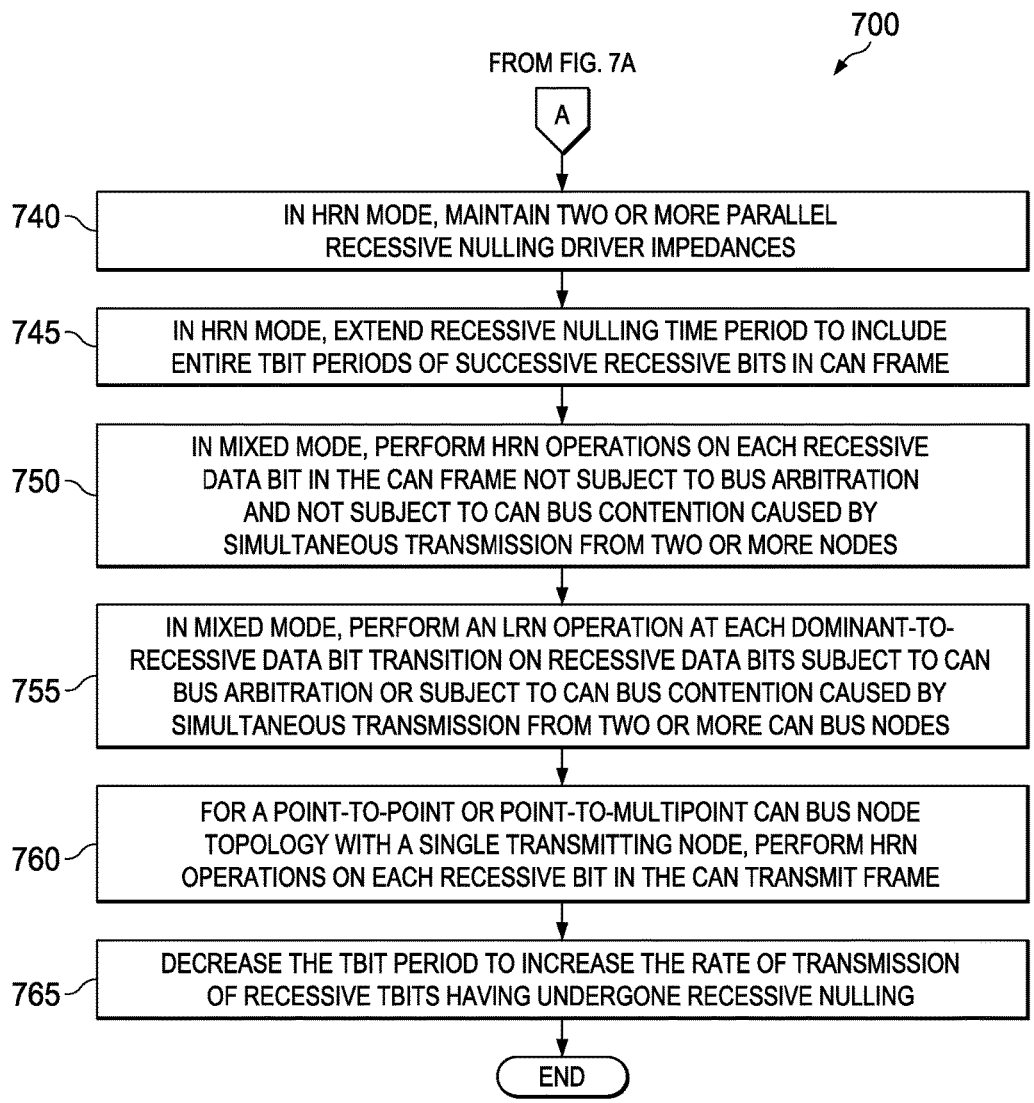

FIGS. 7A and 7B are a flow diagram illustrating a method 700 of CAN bus dominant-to-recessive transmit data bit timing control according to various example sequences. The method 700 commences at block 705 with selecting LRN mode, HRN mode, or mixed-mode for transmission of a CAN data frame.

The method 700 continues at block 710 with selecting the recessive nulling time period associated with LRN mode operation as a function of an expected bus impedance during a recessive bus state. The expected bus impedance is a function of one or more CAN bus characteristics including bus length, bus distributed parasitic capacitance, and bus loading contributed by a CAN node physical layer (PHY) driver. The recessive nulling time period is selected to drive the CAN bus differential waveform toward a recessive state at a chosen rate. The method 700 also includes, for HRN mode and for HRN portions of mixed-mode operation, selecting the recessive nulling time period to include at least one entire tbit period of successive recessive bits in the CAN TxD frame, at block 715.

The method 700 continues at block 720 with detecting a dominant-to-recessive data bit transition in a CAN TxD frame generated by a CAN node controller. The method 700 also includes performing a recessive nulling operation by maintaining at least one recessive nulling driver impedance in parallel with a main CAN node PHY driver across the CAN bus, at block 725. The recessive nulling operation starts at the time of the dominant-to-recessive data bit transition and extends for the selected recessive nulling time period. Recessive nulling increases a rate of decay of a CAN bus dominant-to-recessive differential signal waveform.

In LRN mode, the method 700 includes terminating the recessive nulling operation by releasing the recessive nulling driver impedance from the CAN bus prior to a bus state sampling time, at block 730. The driver releases the recessive nulling impedance upon expiration of the recessive nulling time period and within a tbit associated with the recessive TxD bit to avoid bus loading that could interfere with a CAN bus arbitration process. In LRN mode, the method 700 includes performing the recessive nulling operation on each recessive bit following a dominant bit in the CAN TxD frame, at block 735.

In HRN mode, the method 700 includes maintaining two or more recessive nulling driver impedances in parallel with each other during the recessive nulling time period, at block 740. The method 700 also includes extending the recessive nulling time period to include entire tbit periods of successive recessive bits in the CAN TxD frame, at block 745.

For mixed-mode operation, the method 700 includes performing the recessive nulling operation in HRN mode on each recessive bit in the CAN transmit frame not subject to CAN bus arbitration and not subject to CAN bus contention caused by simultaneous transmission from two or more CAN bus nodes, at block 750. Mixed-mode operation also includes performing an LRN operation on each recessive bit following a dominant bit subject to CAN bus arbitration or subject to CAN bus contention caused by simultaneous transmission from two or more CAN bus nodes, at block 755.

For a point-to-point or point-to-multipoint CAN bus node topology with a single transmitting node, the method 700 includes performing HRN mode recessive nulling operations on all recessive data bits in the CAN transmit frame, at block 760.

The method 700 also includes increasing a rate of transmission of all recessive data bits in the CAN transmit frame subject to recessive nulling operations as compared to a CAN-standard rate of transmission, at block 765.

Figure 8:
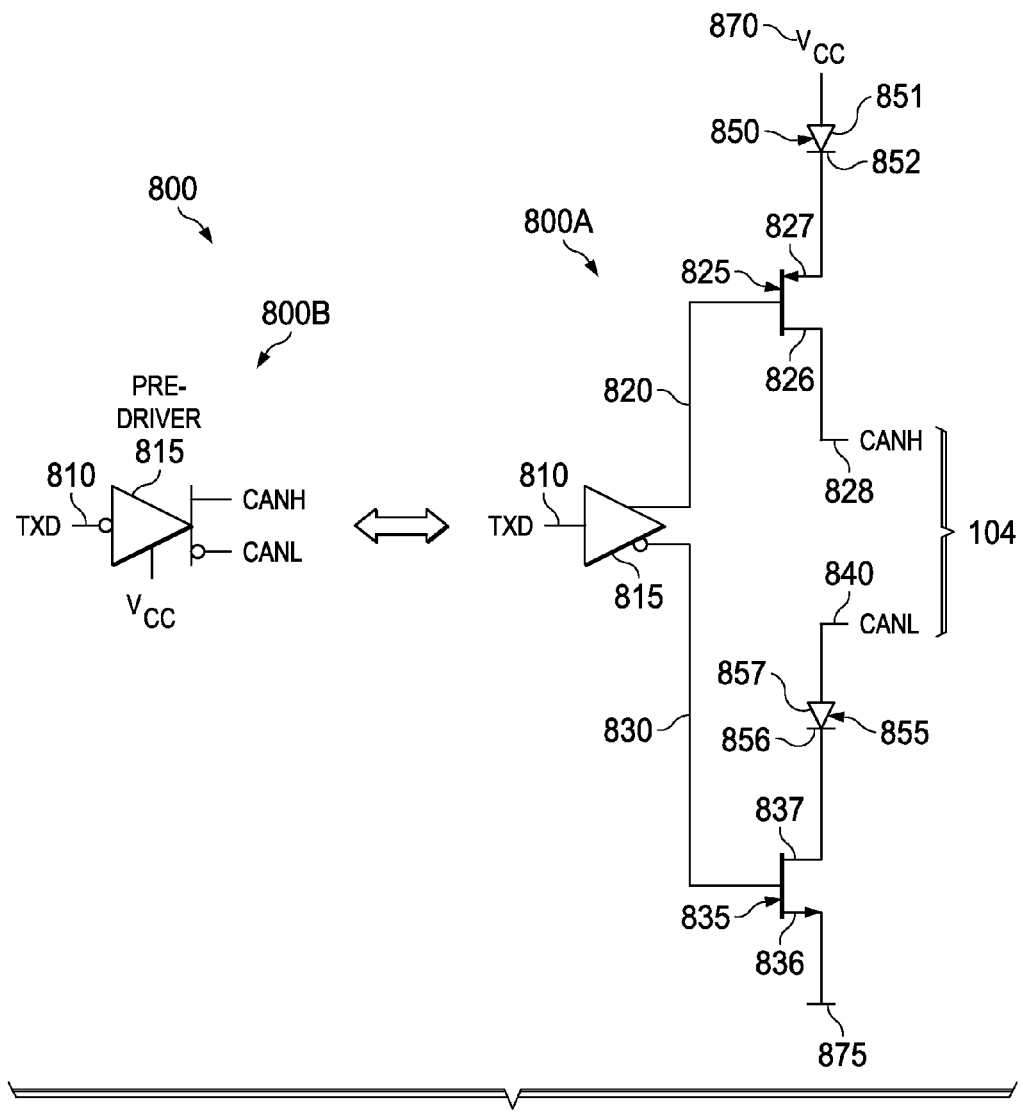
FIG. 8 is a schematic diagram illustrating a CAN bus main driver according to various example embodiments.

FIG. 8 is a schematic diagram 800A and block diagram equivalent 800B illustrating a CAN bus main PHY driver 800 according to various example embodiments. The main PHY driver 800 receives an active-LOW TxD signal on an input 810 of a pre-driver 815. The active-LOW characteristic of the input 810 is indicated by the bubble on the input 810 of the block diagram 800B. An active-LOW transmit data signal on the input 810 drives the in-phase output 820 of the pre-driver 815 to a logic LOW state, causing the PMOS transistor 825 to conduct. Conduction of the PMOS transistor 825 drives the active-HIGH differential output bus line CANH 828 to a logic HIGH state. The active-LOW transmit data signal on the input 810 also drives the out-of-phase output 830 of the pre-driver 815 to a logic HIGH state, causing the NMOS transistor 835 to conduct. Conduction of the NMOS transistor 835 drives the active-LOW differential output bus line CANL 840 to a logic LOW state. Thus, an active-LOW TxD signal drives the CAN bus 104 to an active state. Voltage drops resulting from current flow through a voltage divider including the diodes 850 and 855 and the CAN bus termination resistors 130A, 130B of FIG. 1 establish the CANL-to-CANH voltage differential. A logic-HIGH TxD input signal causes the driver transistors 825 and 835 to be driven to cut-off, leaving the differential outputs 828 and 840 in a high impedance state.

Figure 9:
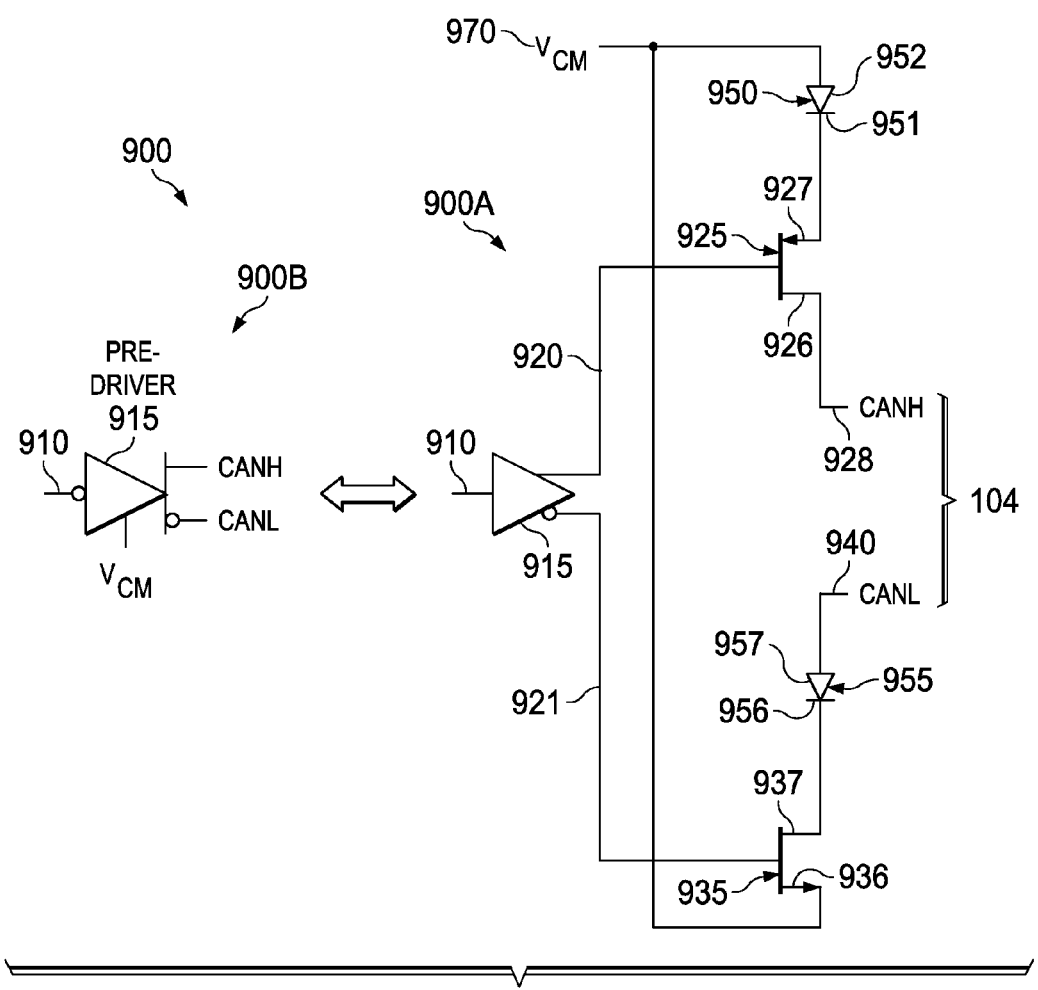
FIG. 9 is a schematic diagram illustrating a CAN bus fractional driver according to various example embodiments.

FIG. 9 is a schematic diagram 900A and block diagram equivalent 900B illustrating a CAN bus recessive nulling driver 900 according to various example embodiments. The recessive nulling driver 900 receives an active-LOW signal on the input 910 of a pre-driver 915. The active-LOW characteristic of the input 910 is indicated by the bubble on the input 910 of the block diagram 900B. The active-LOW signal on the input 910 is received from recessive nulling logic as further described below. The active-LOW signal on the input 910 drives the in-phase output 920 of the pre-driver 915 to a logic-LOW state, causing the PMOS transistor 925 to conduct. Conduction of the PMOS transistor 925 drives the active-HIGH differential output bus line CANH 928 to the CAN bus common-mode voltage of approximately Vcc/2.

Figure 3:
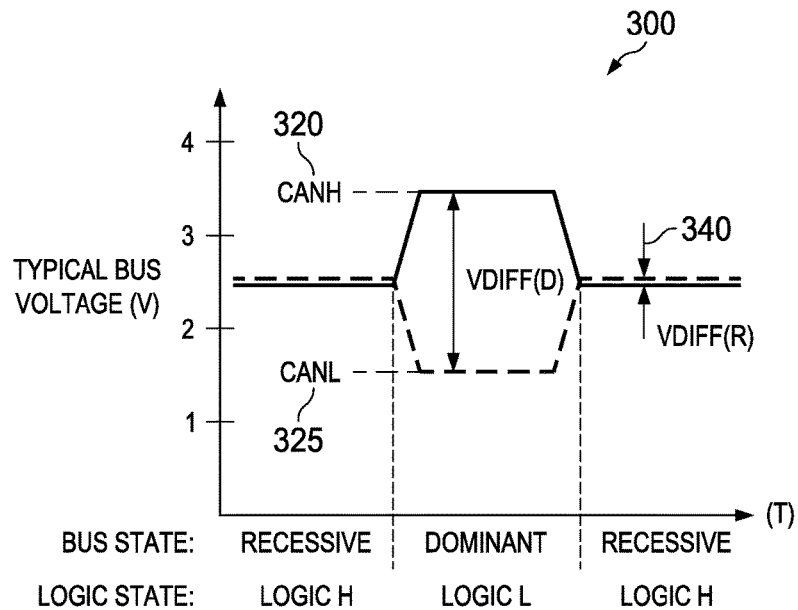
FIG. 3 is a prior-art diagram illustrating an idealized CAN bus differential waveform.

The active-LOW signal on the input 910 also drives the out-of-phase output 921 of the pre-driver 915 to a logic HIGH state, causing the NMOS transistor 935 to conduct. Conduction of the NMOS transistor 935 drives the active-LOW differential output bus line CANL 940 to the CAN bus common-mode voltage of approximately Vcc/2. Thus, a logic LOW input signal drives the CAN bus 104 to a recessive state (e.g., the recessive bus state represented by the recessive voltage differential 340 of FIG. 3). A logic-HIGH input signal causes the driver transistors 925 and 935 to be driven to cut-off, leaving the differential outputs 928 and 940 in a high impedance state. It is noted that the pre-driver 915 and the driver transistors 925 and 935 are sized to provide only a fraction (e.g., one-eighth) of the active-state impedance of the main PHY driver of FIG. 8. An equivalent view of the CAN bus recessive nulling driver 900 is that the driver 900, when active, places an additional parallel impedance across the CAN bus 104 to discharge any parasitic capacitance that may be holding the bus rails at a non-zero differential voltage.

Figure 10:
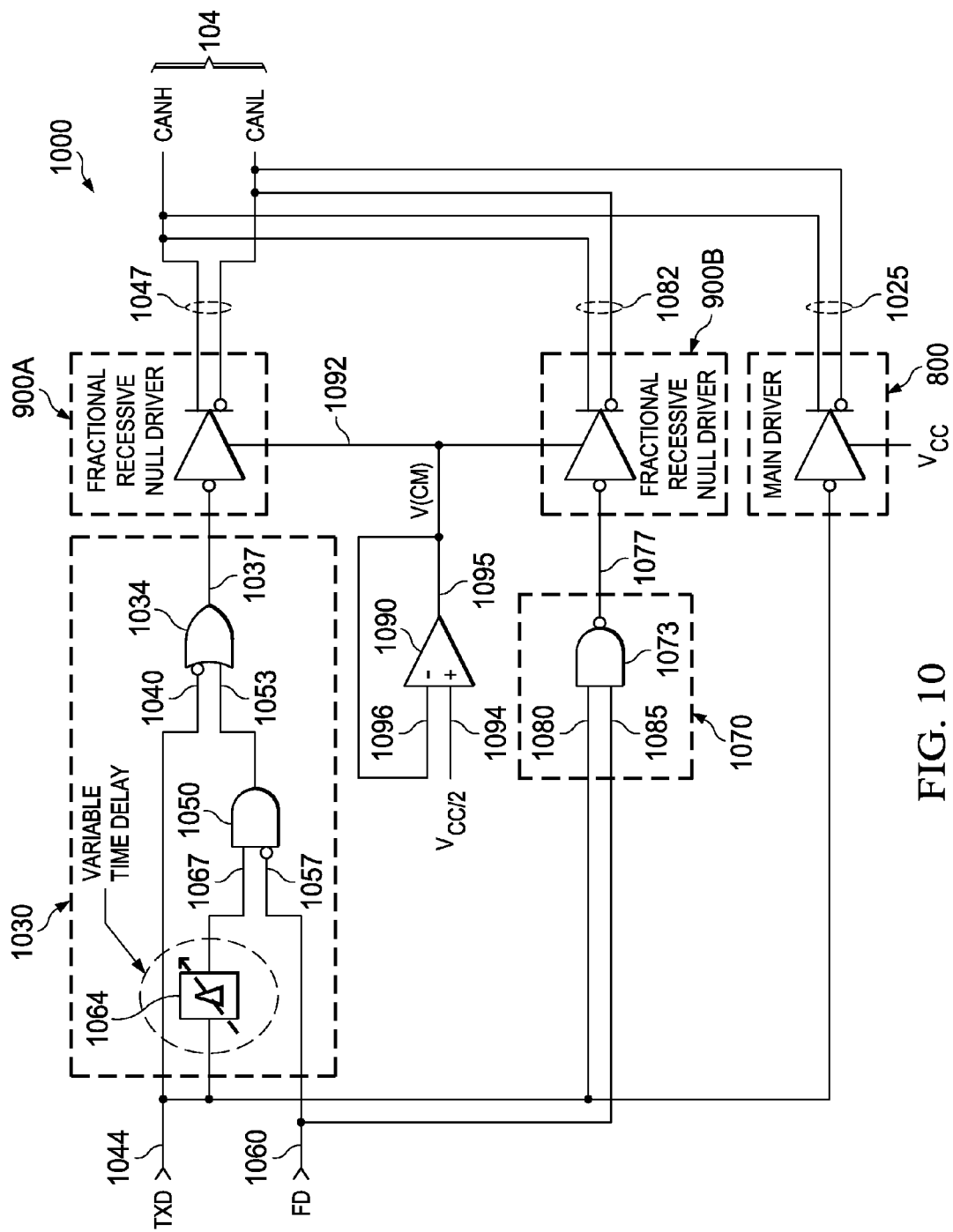
FIG. 10 is a schematic diagram of an apparatus for exercising CAN bus dominant-to-recessive transmit data bit timing control according to various example embodiments.

FIG. 10 is a schematic diagram of an apparatus 1000 for exercising CAN bus dominant-to-recessive transmit data bit timing control according to various example embodiments.

The apparatus 1000 includes the main CAN node PHY differential driver circuit 800 as described in detail above with reference to FIG. 8. Turning back to FIG. 8, the main driver circuit 800 includes the differential pre-driver 815, the PMOS transistor 825 gate-coupled to the in-phase output 820 of the differential pre-driver 815. A drain terminal 826 of the PMOS transistor 825 is communicatively coupled to the voltage HIGH rail (CANH) 828 of the CAN bus 104. A first diode 850 is coupled in series with a current path of the PMOS transistor 825. An anode terminal 851 of the first diode 850 is coupled to a positive supply voltage rail 870. A cathode terminal 852 of the first diode 850 is coupled to a source terminal 827 of the PMOS transistor 825.

The main driver circuit 800 also includes the NMOS transistor 835 gate-coupled to the out-of-phase output 830 of the differential pre-driver 815. A source terminal 836 of the NMOS transistor 835 is communicatively coupled to a ground voltage rail 875. A second diode 855 is coupled in series with a current path of the NMOS transistor 835. A cathode terminal 856 of the second diode 855 is coupled to a drain terminal 837 of the NMOS transistor 835; and an anode terminal 857 of the second diode 855 is coupled to the voltage LOW rail (CANL) 840 of the CAN bus 104.

Figure 1:
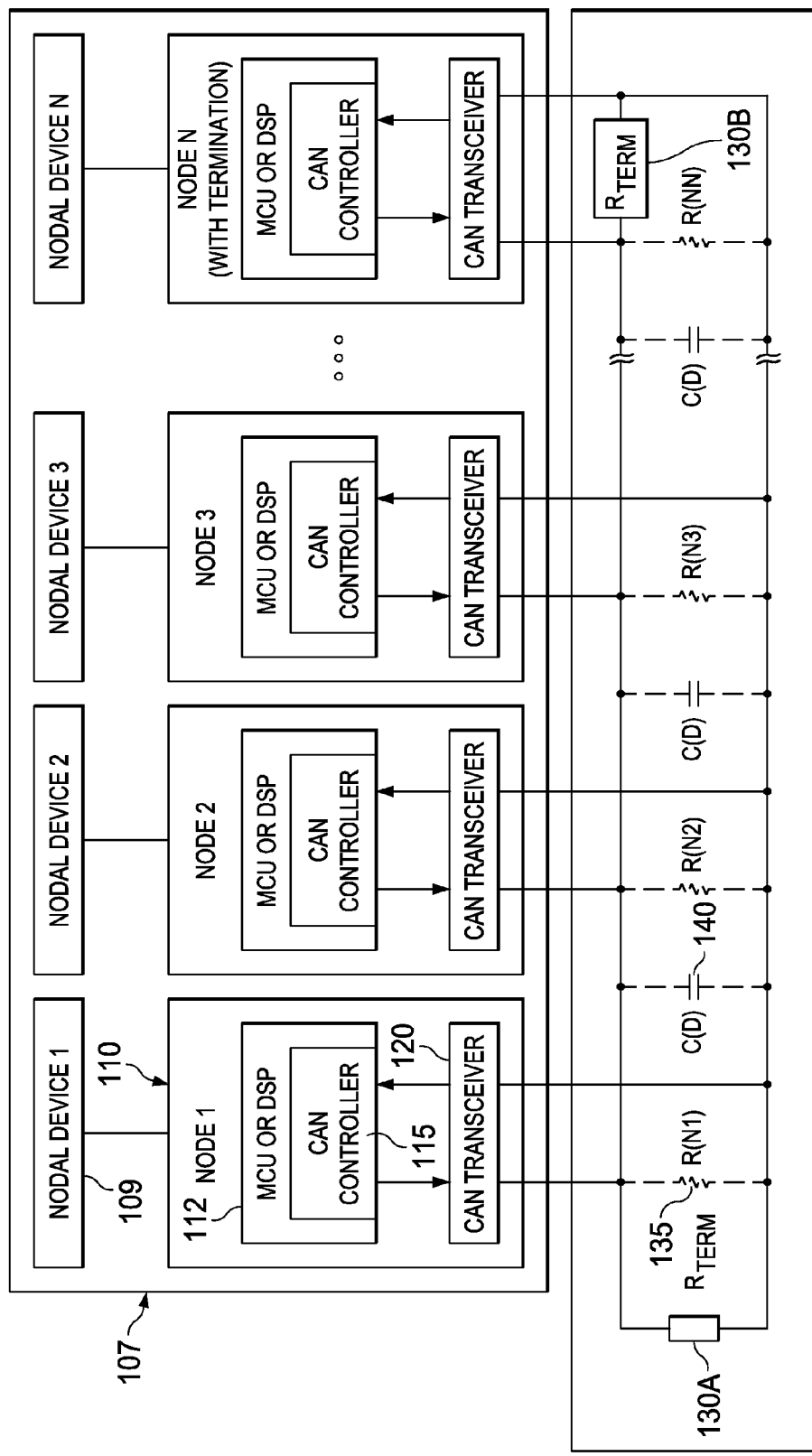
FIG. 1 is a prior-art diagram illustrating CAN bus and node architecture.

Turning back to FIG. 10, the main driver circuit 800 drives the CAN bus 104 to an active state upon receipt at an input 1044 of a dominant (logic LOW) TxD bit in a CAN TxD frame (e.g., the CAN frame 200 of FIG. 2) received from a CAN node controller (e.g., the CAN controller 115 of FIG. 1).

The apparatus 1000 also includes one or more recessive nulling fractional differential driver circuits 900A and 900B output-coupled in parallel with the main driver circuit 800. Each of the recessive nulling fractional driver circuits 900A and 900B is as described above with respect to FIG. 9. Turning back to FIG. 9, each of the fractional driver circuits 900A, 900B includes the differential pre-driver 915 to accept an active-LOW signal at the input 910 from a dominant-to-recessive TxD bit timing control logic circuit as further described below. The recessive nulling fractional drivers 900A and 900B also each include the PMOS transistor 925 gate-coupled to the in-phase output 920 of the differential pre-driver 915. A drain terminal 926 of the PMOS transistor 925 is communicatively coupled to the voltage HIGH rail (CANH) 928 of the CAN bus 104. A first diode 950 is coupled in series with a current path of the PMOS transistor 925. A cathode terminal 951 of the first diode 950 is coupled to a source terminal 927 of the PMOS transistor 925. An anode terminal 952 of the first diode 950 is coupled to a common-mode voltage source 970.

The fractional drivers 900A and 900B also each includes the NMOS transistor 935 gate-coupled to an out-of-phase output 921 of the differential pre-driver 915. A source terminal 936 of the NMOS transistor 935 is communicatively coupled to the common-mode voltage source 970. A second diode 955 is coupled in series with a current path of the NMOS transistor 935. A cathode terminal 956 of the second diode 955 is coupled to a drain terminal 937 of the NMOS transistor 935; and an anode terminal 957 of the second diode 955 is coupled to the voltage LOW rail (CANL) 940 of the CAN bus 104.

Turning back now to FIG. 10, one or more of the recessive nulling driver circuits 900A, 900B enters a conductive state to insert a recessive nulling impedance in parallel with the differential output 1025 of the main CAN node PHY driver 800. The recessive nulling impedance is inserted across the CAN bus 104 for a selected recessive nulling time period during a recessive bit time period associated with one or more recessive data bits in the CAN TxD frame. Doing so increases a rate of decay of a CAN bus dominant-to-recessive differential signal waveforms 500 and 600 associated with a dominant-to-recessive data bit transition as previously illustrated in FIGS. 5 and 6, respectively.

The apparatus 1000 also includes a first timing control logic circuit 1030 coupled to the first recessive nulling driver 900A to provide control for recessive nulling operations. The logic circuit 1030 includes an OR gate 1034 with an output 1037 coupled to the first recessive nulling fractional differential driver circuit 900A. The OR gate 1034 drives the fractional differential driver circuit 900A to a conductive state when the OR gate output 1037 is logic LOW. A negated first input 1040 of the OR gate 1034 is coupled to the dominant LOW TxD input line 1044 to ensure that a dominant LOW state of the TxD signal holds an output 1047 of the first fractional differential driver circuit 900A in an inactive high impedance state.

The first timing control circuit 1030 also includes an AND gate 1050. An output 1053 of the AND gate 1050 is coupled to a non-negated second input of the OR gate 1034. A negated first input 1057 of the AND gate 1050 is coupled to an active-HIGH FD indicator signal line 1060. The signal line 1060 drives the first fractional differential driver circuit 900A to the conductive state when the FD indicator signal is active during recessive TxD bit times.

The first timing control circuit 1030 further includes a one-shot delay line 1064 coupled between the TxD input line 1044 and a second input 1067 of the AND gate 1050. In some embodiments, the delay time associated with the one-shot delay line 1064 may be configurable (e.g., with off-chip resistor or capacitor elements or other delay time adjustment elements). The one-shot delay line 1064 causes the first fractional differential driver circuit 900A to be driven to the conductive state at a TxD dominant-to-recessive transition. Upon expiration of the selected recessive nulling time period the one-shot 1064 causes the driver circuit 900A outputs 1047 to be released to a high impedance state.

The apparatus 1000 also includes a second timing control logic circuit 1070 used to control the second recessive nulling fractional differential driver circuit 900B. The logic circuit 1070 includes a NAND gate 1073 with an output 1077 coupled to an input of the second fractional differential driver circuit 900B. The logic circuit 1070 drives the second fractional differential driver circuit 900B to the conductive state when the NAND gate output 1077 is logic LOW. A first input 1080 of the NAND gate 1073 is coupled to the TxD input line 1044 to insure that outputs 1082 of the second recessive nulling driver 900B are held in a high impedance state during dominant TxD bit times. A second input 1085 of the NAND gate 1073 is coupled to the active-HIGH FD indicator signal input 1060 from the CAN controller. An active FD indicator signal causes the second fractional differential driver circuit 900B to be driven to the conductive state when the FD signal is set HIGH by the CAN controller and the TxD input line 1044 is set HIGH during recessive TxD bit times.

It is noted that the logic components and their configuration as shown for the example embodiments of the first and second timing control logic circuits 1030 and 1070 may differ from alternative embodiments of the circuits 1030 and 1070 providing the same functionality.

The apparatus 1000 also includes a common-mode voltage supply element 1090 to supply a common-mode voltage rail 1092 to the one or more recessive nulling fractional differential driver circuits (e.g., the driver circuits 900A and 900B). In some embodiments of the apparatus 1000, the common-mode voltage supply element 1092 may include an operational amplifier with a voltage level of V(CC)/2 applied to a non-inverting input 1094 and an output 1095 of the operational amplifier fed back to an inverting input 1096.

Figure 11:
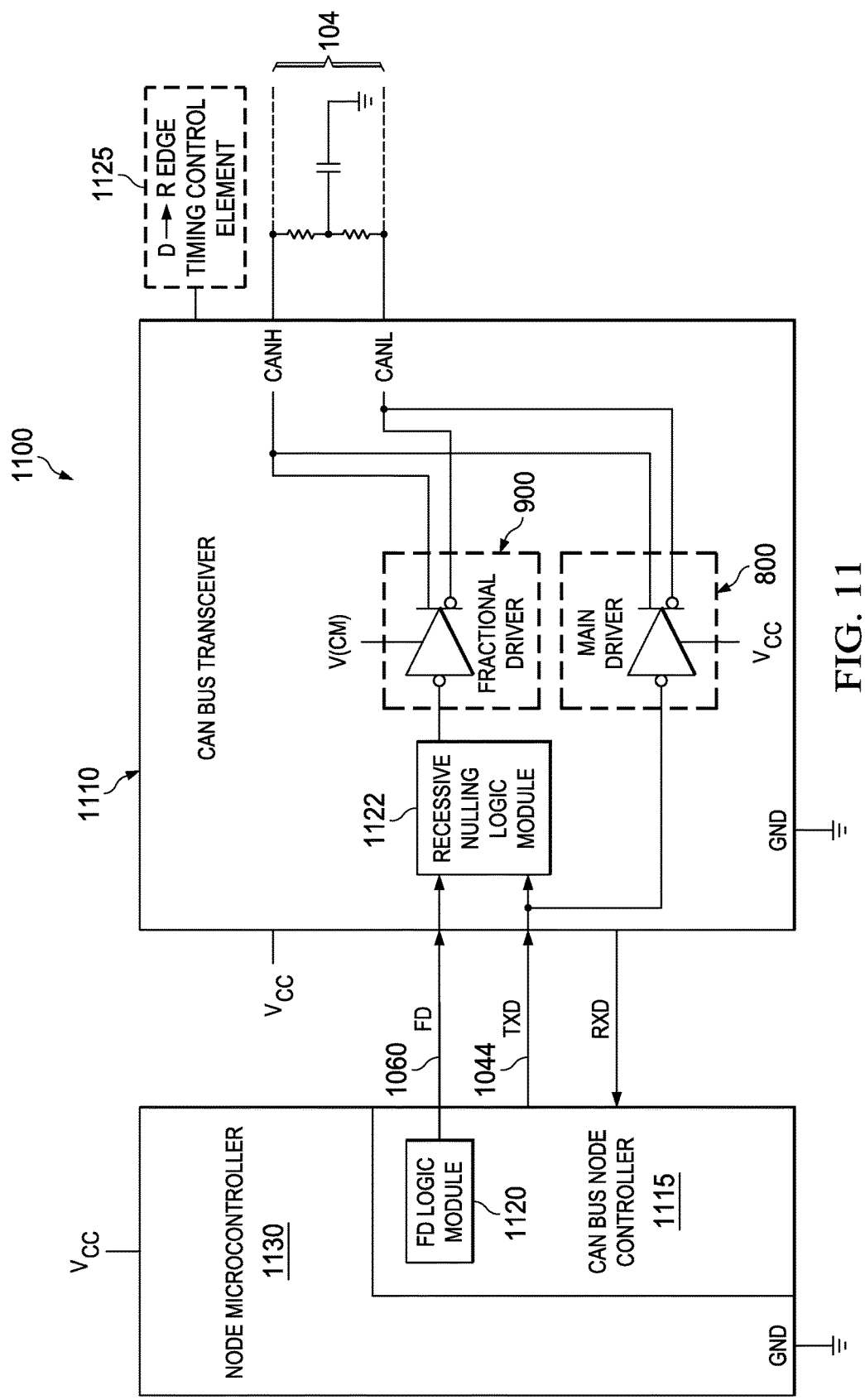
FIG. 11 is a block diagram of a system for exercising CAN bus dominant-to-recessive transmit data bit timing control according to various example embodiments.

FIG. 11 is a block diagram of a system 1100 for exercising CAN bus dominant-to-recessive transmit data bit timing control according to various example embodiments. The system 1100 includes a CAN bus transceiver 1110 to send differential signals on a CAN bus 104 and to exercise control of impedance on the CAN bus 104.

The system 1100 includes a CAN bus node controller 1115 coupled to the CAN bus transceiver 1110. The CAN bus node controller 1115 assembles TxD frames for transmission to another bus node on the CAN bus 104 and selectively activates an FD signal line 1060 to indicate portions of the TxD frames to be transmitted at a higher than CAN-standard data rate. Some embodiments of the CAN bus node controller 1115 include an FD logic module 1120. The FD logic module 1120 causes the CAN bus transceiver 1110 to insert an additional recessive nulling impedance across the CAN bus 104 and to indicate the portion of the CAN frame to be transmitted at a higher than CAN-standard data rate.

The CAN bus transceiver 1110 includes a main CAN node PHY differential driver portion 800. The main CAN node driver 800 drives the CAN bus 104 to an active state upon receipt of a dominant TxD bit in a CAN TxD frame received from the CAN bus node controller 1115 on the TxD input 1044.

The CAN bus transceiver 1110 also includes one or more recessive nulling fractional differential drivers (e.g., the driver 900) output-coupled in parallel with the main driver 800. The recessive nulling fractional driver(s) 900 perform recessive nulling operations as previously described by entering a conductive state and inserting a recessive nulling impedance in parallel with the differential output of the main driver 800 across the CAN bus 104. The recessive nulling impedance remains in place for a selected recessive nulling time period during a recessive bit time period associated with one or more recessive data bits in the CAN TxD frame. Doing so increases a rate of decay of the CAN bus dominant-to-recessive differential signal waveform associated with a dominant-to-recessive data bit transition.

The CAN bus system 1100 includes a recessive nulling logic module 1122. The logic module 1122 includes logic as previously described in conjunction with the timing control logic modules 1030 and 1070 of FIG. 10. The logic module 1122 accepts the FD and TxD inputs 1060 and 1044, respectively, and selectively enables/disables the recessive nulling fractional driver(s) 900 as previously described in conjunction with FIG. 10.

The CAN bus system 1100 further includes a dominant-to-recessive edge timing control element 1125 coupled to the CAN bus transceiver 1110. The edge timing control element 1125 determines the recessive nulling time period. In some embodiments, the edge timing control element 1125 may include an off-chip resistor, capacitor, or other electronic element whose value may be chosen to control the recessive nulling time period.

The system 1100 also includes a node microcontroller 1130 communicatively coupled to or incorporating the CAN bus node controller 1115. The node microcontroller 1130 generates messages to be transmitted to other node microcontrollers on the CAN bus 104.

Apparatus, systems and methods described herein may be useful in applications other than decreasing CAN frame bit times in order to increase CAN bus bandwidth and throughput. Examples of the method 700, apparatus 1000, and system 1100 are intended to provide a general understanding of the sequences of various methods and the structures of various embodiments. They are not intended to serve as complete descriptions of all elements and features of methods, apparatus and systems that might make use of these example sequences and structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), motor vehicles, medical devices (e.g., heart monitor, blood pressure monitor, etc.), set top boxes, and others.

Structures and methods disclosed herein add additional "recessive nulling" bus impedance in parallel across the CAN bus starting at selected dominant-to-recessive bit transitions. Doing so decreases overall parallel bus impedance to more quickly discharge residual charge stored in parasitic bus capacitance. CAN bus dominant-to-recessive waveform fall rates are increased (fall times shortened), permitting a decrease in CAN frame bit times in order to increase CAN bus bandwidth and throughput without sacrificing the integrity of the CAN bus arbitration mechanism.

The invented structures and methods may operate in LRN mode, affecting only a beginning portion of a dominant-to-recessive CAN bus waveform transition prior to the bus state sampling point. For certain special-case, single-master, non-arbitrating bus topologies, the invented structures and methods may operate in HRN-only mode, affecting all recessive bits for the entire tbit period. In mixed-mode, HRN mode operation may be performed on recessive bits in the CAN frame not subject to CAN bus arbitration or other multi-sender operations and LRN mode operation performed on other CAN frame bits.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed.

Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A method of bus edge-timing control suitable for use in a controller area network (CAN) including nodes communicating over a differential bus including differential (dominant) data bit signals with a differential voltage, and common-mode (recessive) data bit signals with a common-mode voltage, each with a transmission bit period, comprising:
   transmitting transmit data (TxD) generated by a node including dominant and recessive data bit signals;
   detecting a dominant-to-recessive data bit falling-edge transition in the transmit data (TxD); and
   during the dominant-to-recessive falling-edge transition, performing a recessive nulling operation by adding at least one recessive nulling impedance based on the common-mode voltage in parallel with the differential bus starting at the time of the dominant-to-recessive data bit transition and extending for a selected recessive nulling time period in order to increase a rate of decay of the dominant-to-recessive falling-edge transition.

2. The method of bus edge-timing control of claim 1, further comprising:
   a light recessive nulling (LRN) mode of the recessive nulling operation in which the recessive nulling time period is less than the transmission bit period.

3. The method of bus edge-timing control of claim 1, wherein, for a point-to-point or point-to-multipoint bus node topology with a single transmitting node, the recessive nulling operation comprises:
   performing a heavy recessive nulling (HRN) mode in which the recessive nulling time period includes the entire transmission bit period; and
   adding at least two recessive nulling impedances based on the common-mode voltage in parallel with the differential bus; and
   decreasing the transmission bit period for the recessive bit.

4. The method of bus edge-timing control of claim 2, the LRN mode of the recessive nulling operation further comprising:
   selecting the recessive nulling time period associated with the LRN operation as a function of at least one of an expected bus impedance during a recessive bus state bus distributed parasitic capacitance, and bus loading associated with the dominant-to-recessive falling-edge transition.

5. The method of bus edge-timing control of claim 2, the LRN mode of the recessive nulling operation further comprising:
   decreasing the transmission bit period for the recessive bit.

6. The method of bus edge-timing control of claim 2, further comprising:
   a heavy recessive nulling (HRN) mode of the recessive nulling operation in which the recessive nulling time period includes the entire transmission bit period;
   the LRN and HRN modes being performed on a selective mutually exclusive basis.

7. The method of bus edge-timing control of claim 6, the HRN mode of the recessive nulling operation further comprising:
   adding at least two recessive nulling impedances based on the common-mode voltage in parallel with the differential bus.

8. The method of bus edge-bit timing control of claim 7, further comprising operating in a mixed mode including:
   performing the recessive nulling operation in HRN mode on each recessive bit not subject to bus arbitration and not subject to bus contention caused by simultaneous transmission from two or more nodes; and
   performing the recessive nulling operation in LRN mode on each recessive bit subject to bus arbitration or subject to bus contention caused by simultaneous transmission from two or more nodes.

9. An apparatus for use in a node of a controller area network (CAN) with a CAN bus, comprising:
   a main CAN node physical layer (PHY) differential driver circuit to
      drive the CAN bus to a dominant state with a differential voltage for a dominant TxD bit, and
      drive the CAN bus to a recessive state with a common-mode voltage for a recessive TxD bit,
      each dominant and recessive state with a transmission bit period; and
   a recessive nulling fractional differential driver circuit output-coupled to the main CAN node PHY differential driver circuit, operable during a dominant-to-recessive data bit falling-edge transition to insert a recessive nulling impedance in parallel with a differential output of the main CAN node PHY driver across the CAN bus for a selected recessive nulling time period based on the common-mode voltage, during a recessive nulling time period.

10. The apparatus of claim 9, wherein the main CAN PHY differential driver circuit further comprises:
   a differential pre-driver;
   a PMOS transistor gate-coupled to an in-phase output of the differential pre-driver, a drain terminal of the PMOS transistor communicatively coupled to a voltage HIGH rail (CANH) of the CAN bus;
   a first diode coupled in series with a current path of the PMOS transistor, a cathode terminal of the first diode coupled to a source terminal of the PMOS transistor and an anode terminal of the first diode coupled to a positive supply voltage rail;
   an NMOS transistor gate-coupled to an out-of-phase output of the differential pre-driver, a source terminal of the NMOS transistor communicatively coupled to a ground voltage rail; and
   a second diode coupled in series with a current path of the NMOS transistor, a cathode terminal of the second diode coupled to a drain terminal of the NMOS transistor and an anode terminal of the second diode coupled to a voltage LOW rail (CANL) of the CAN bus.

11. The apparatus of claim 9, the recessive nulling fractional differential driver circuit further comprising:
a differential pre-driver;
a PMOS transistor gate-coupled to an in-phase output of the differential pre-driver, a drain terminal of the PMOS transistor communicatively coupled to a voltage HIGH rail (CANH) of the CAN bus;
a first diode coupled in series with a current path of the PMOS transistor, a cathode terminal of the first diode coupled to a source terminal of the PMOS transistor and an anode terminal of the first diode coupled to a common-mode voltage source;
an NMOS transistor gate-coupled to an out-of-phase output of the differential pre-driver, a source terminal of the NMOS transistor communicatively coupled to the common-mode voltage source; and
a second diode coupled in series with a current path of the NMOS transistor, a cathode terminal of the second diode coupled to a drain terminal of the NMOS transistor and an anode terminal of the second diode coupled to a voltage LOW rail (CANL) of the CAN bus.

12. The apparatus of claim 9, further comprising:
a first timing control logic circuit to control a first recessive nulling fractional differential driver circuit, including:
an OR gate with an output coupled to the first recessive nulling fractional differential driver circuit to drive the fractional differential driver circuit to a conductive state when the OR gate output is logic LOW, a negated first input of the OR gate coupled to a dominant LOW TxD input line to ensure that a dominant LOW state of the TxD signal holds an output of the first fractional differential driver circuit in an inactive high impedance state;
an AND gate with an output coupled to a non-negated second input of the OR gate, a negated first input of the AND gate coupled to an active-HIGH flexible data rate (FD) indicator signal line to drive the first fractional differential driver circuit to the conductive state when the FD indicator signal is active during recessive TxD bit times; and
a delay line coupled between the TxD input line and a second input of the AND gate to cause the first fractional differential driver circuit to be driven to the conductive state at a TxD dominant-to-recessive transition for the selected recessive nulling time period and then to be released to the high impedance state at the end of the selected recessive nulling time period.

13. The apparatus of claim 9, further comprising:
a second timing control logic circuit to control a second recessive nulling fractional differential driver circuit, including:
a NAND gate with an output coupled to an input of the second fractional differential driver circuit to drive the second fractional differential driver circuit to the conductive state when the NAND gate output is logic LOW, a first input of the NAND gate coupled to a TxD input line to insure that outputs of the second recessive nulling driver are held in a high impedance state during dominant TxD bit times, and a second input of the NAND gate coupled to an active-HIGH flexible data rate (FD) indicator signal input from the CAN controller to cause the second fractional differential driver circuit to be driven to the conductive state when the FD signal is set HIGH by the CAN controller and the TxD input line is HIGH during recessive TxD bit times.

14. The apparatus of claim 9, further comprising:
a common-mode voltage supply element to supply the common-mode voltage to the at least one recessive nulling fractional differential driver circuit.

15. The apparatus of claim 14, the common-mode voltage supply element an operational amplifier with a voltage level of V(CC)/2 applied to a non-inverting input and an output of the operational amplifier fed back to an inverting input.

16. A controller area network (CAN) with CAN nodes connected to a CAN bus, each CAN node comprising:
a CAN bus transceiver to send differential signals on the CAN bus, and to exercise control of a CAN bus impedance;
a CAN bus node controller to assemble transmit data (TxD) frames for transmission to another bus node on the CAN bus and to selectively activate a flexible data rate (FD) signal line;
a main CAN node physical layer (PHY) differential driver portion of the CAN bus transceiver to
drive the CAN bus to a dominant state with a differential voltage for a dominant TxD bit, and
drive the CAN bus to a recessive state with a common-mode voltage for a recessive TxD bit,
each dominant and recessive state with a transmission bit period; and
a recessive nulling fractional differential driver portion of the CAN bus transceiver output-coupled in parallel with the main CAN node PHY differential driver circuit, operable during a dominant-to-recessive data bit falling-edge transition to perform a recessive nulling operation by inserting a recessive nulling impedance in parallel with a differential output of the main CAN node PHY differential driver circuit across the CAN bus for a selected recessive nulling time period during a recessive bit time period based on the common-mode voltage.

17. The system of claim 16, each node further comprising:
a node microcontroller communicatively coupled to the CAN bus node controller to generate messages to be transmitted to other node microcontrollers on the CAN bus.

18. The system of claim 16, each node further comprising:
an FD logic module component of the CAN bus node controller to cause the CAN bus transceiver to insert an additional recessive nulling impedance across the CAN bus and to indicate a portion of the CAN frame to be transmitted at a higher than CAN-standard data rate.

19. The system of claim 16, each node further comprising:
a dominant-to-recessive edge timing control element to determine the recessive nulling time period.

20. The system of claim 19, the dominant-to-recessive edge timing control element being at least one of a resistor or a capacitor.

* * * * *